(12) United States Patent
Onitake et al.

(10) Patent No.: US 9,835,209 B2
(45) Date of Patent: Dec. 5, 2017

(54) CONTROL METHOD AND CONTROL DEVICE FOR DOG CLUTCH

(71) Applicant: JTEKT Corporation, Osaka-shi (JP)

(72) Inventors: Minoru Onitake, Kariya (JP);
Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/397,185

(22) Filed: Jan. 3, 2017

(65) Prior Publication Data
US 2017/0198766 A1    Jul. 13, 2017

(30) Foreign Application Priority Data

Jan. 13, 2016 (JP) ................. 2016-004252

(51) Int. Cl.
| | | |
|---|---|---|
| *F16D 11/10* | (2006.01) | |
| *F16D 48/06* | (2006.01) | |
| *F16D 11/14* | (2006.01) | |
| *F16D 27/108* | (2006.01) | |
| *F16H 48/24* | (2006.01) | |
| *F16H 48/34* | (2012.01) | |
| *F16D 11/00* | (2006.01) | |
| *F16D 27/00* | (2006.01) | |

(52) U.S. Cl.
CPC ........... *F16D 48/064* (2013.01); *F16D 11/14* (2013.01); *F16D 27/108* (2013.01); *F16H 48/24* (2013.01); *F16H 48/34* (2013.01); *F16D 2011/008* (2013.01); *F16D 2027/002* (2013.01); *F16D 2500/1022* (2013.01); *F16D 2500/10425* (2013.01); *F16D 2500/10462* (2013.01); *F16D 2500/30401* (2013.01)

(58) Field of Classification Search
CPC ...... F16D 48/064; F16D 27/108; F16D 11/14; F16D 2500/10425; F16D 2500/30401; F16D 2500/10462; F16D 2500/1022; F16D 2027/002; F16D 2011/008; F16H 48/34; F16H 48/24
See application file for complete search history.

(56) References Cited

U.S. PATENT DOCUMENTS

| | | | | |
|---|---|---|---|---|
| 2005/0279607 A1* | 12/2005 | Fusegi | ................. | F16D 27/118 192/84.96 |
| 2009/0137362 A1* | 5/2009 | Yonezawa | ............. | F16D 48/064 477/5 |
| 2013/0062154 A1* | 3/2013 | Burns | ................ | B60K 23/0808 192/84.1 |

FOREIGN PATENT DOCUMENTS

JP         2006-29579        2/2006

* cited by examiner

*Primary Examiner* — David J Hlavka
(74) *Attorney, Agent, or Firm* — Oblon, McClelland, Maier & Neustadt, L.L.P.

(57) ABSTRACT

A dog clutch includes: a first rotational member; a second rotational member; a clutch member; an electromagnetic coil; and a position detecting portion. A control method for the dog clutch, includes: supplying an exciting current to the electromagnetic coil when the clutch member is moved from the non-connecting position toward the connecting position; and promptly reducing the exciting current when the position detecting portion detects that the clutch member has moved to the connecting position.

7 Claims, 10 Drawing Sheets

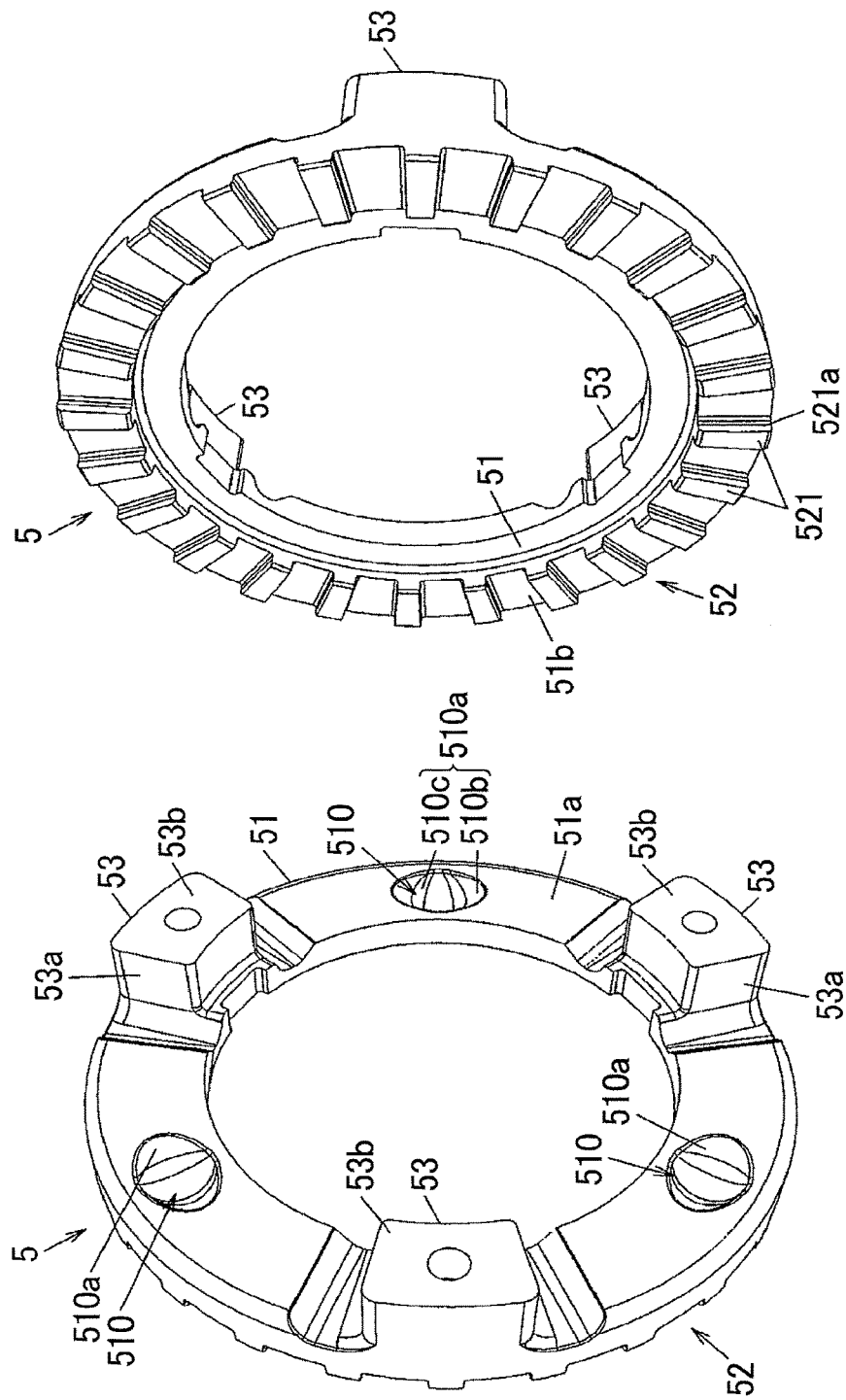

CONTROL METHOD AND CONTROL DEVICE FOR DOG CLUTCH

INCORPORATION BY REFERENCE

The disclosure of Japanese Patent Application No. 2016-004252 filed on Jan. 13, 2016 including the specification, drawings and abstract is incorporated herein by reference in its entirety.

BACKGROUND OF THE INVENTION

1. Field of the Invention

The present invention relates to a control method for a dog clutch that transmits a torque by meshing and a control device for a dog clutch.

2. Description of Related Art

A dog clutch that can transmit a torque by meshing is used to lock (differentially lock) a differential action between a pair of side gears of a differential device of a vehicle, for example (e.g., see Japanese Patent Application Publication No. 2006-29579 (JP 2006-29579 A)).

The differential device described in JP 2006-29579 A includes an electromagnetic coil, a plunger that moves due to a magnetic force of the electromagnetic coil, and a clutch ring having meshing teeth configured to mesh with one side gear out of the pair of side gears, as a structure to lock the differential action between the pair of side gears. When a current is applied to the electromagnetic coil, the meshing teeth of the clutch ring mesh with the one side gear along with a movement of the plunger, so that a relative rotation between a differential case and the one side gear is restricted. Accordingly, a pair of pinion gears pivotally supported by a pinion shaft rotating integrally with the differential case cannot rotate, so that the differential action between the one side gear and the other side gear is restricted.

When a differential-lock operation switch operated by a driver enters an ON state, a control device for controlling the differential device supplies an exciting current to the electromagnetic coil. The control device detects by a signal of a position switch that the meshing teeth of the clutch ring mesh with the one side gear. The control device is configured such that, when the meshing is detected, the control device starts a timer, and when a timer value reaches a predetermined threshold, the control device decreases a current to be supplied to the electromagnetic coil from a current necessary to mesh the clutch ring to a relatively small current to such an extent that a meshing state is maintained.

SUMMARY OF THE INVENTION

In a control method described in JP 2006-29579 A, while a differential-lock state is maintained, power consumption is restrained and heat generation of the electromagnetic coil is also restrained in comparison with a case where a current necessary to continuously mesh the clutch ring is kept flowing. However, the heat generation of the electromagnetic coil increases according to a product of a current amount and a time, so some restrictions might occur in mountability to a vehicle in consideration of a heat dissipation property. Further, when a relatively large current flows for a long time, the electromagnetic coil may become unusable within an intermittent rating. In this case, it is necessary to use a larger-capacity electromagnetic coil. Thus, the method described in JP 2006-29579 A left room for improvement in those points.

In view of this, the present invention provides a control method and a control device for a dog clutch that is able to further reduce power consumption and to restrain heat generation of an electromagnetic coil.

A first aspect of the present invention relates to a control method for a dog clutch, the dog clutch including: a first rotational member; a second rotational member placed rotatable relative to the first rotational member around a common rotating axis; a clutch member restricted from rotating relative to the first rotational member, the clutch member having meshing teeth meshing with the second rotational member, the clutch member being movable between a connecting position where the meshing teeth mesh with the second rotational member and a non-connecting position where the meshing teeth do not mesh with the second rotational member; an electromagnetic coil configured to generate a magnetic force to move the clutch member from the non-connecting position to the connecting position; and a position detecting portion configured to detect a position of the clutch member. The control device includes: supplying an exciting current to the electromagnetic coil when the clutch member is moved from the non-connecting position toward the connecting position; and promptly reducing the exciting current when the position detecting portion detects that the clutch member has moved to the connecting position.

Further, a second aspect of the present invention relates to a control device for a dog clutch, the dog clutch including: a first rotational member; a second rotational member placed rotatable relative to the first rotational member around a common rotating axis; a clutch member restricted from rotating relative to the first rotational member, the clutch member having meshing teeth meshing with the second rotational member, the clutch member being movable between a connecting position where the meshing teeth mesh with the second rotational member and a non-connecting position where the meshing teeth do not mesh with the second rotational member; an electromagnetic coil configured to generate a magnetic force to move the clutch member from the non-connecting position toward the connecting position; and a position detecting portion configured to detect a position of the clutch member. The control device includes an ECU. When the clutch member is moved from the non-connecting position toward the connecting position, the ECU is configured to supply an exciting current to the electromagnetic coil, and when the position detecting portion detects that the clutch member has moved to the connecting position, the ECU is configured to promptly reduce the exciting current.

According to the control method and the control device for the dog clutch according to the above aspects, it is possible to reduce power consumption and to restrain heat generation of the electromagnetic coil.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4A is a perspective view of a clutch member constituting a pressing mechanism of the dog clutch;

FIG. 4B is a perspective view of the clutch member constituting the pressing mechanism of the dog clutch;

DETAILED DESCRIPTION OF EMBODIMENTS

An embodiment of the present invention will be described with reference to FIGS. 1 to 7. Note that the embodiment described below shows a preferred concrete example on performing the present invention. There are some parts that specifically exemplify various technical matters that are technically preferable, but the technical scope of the present invention is not limited to such concrete examples.

Figure 1:
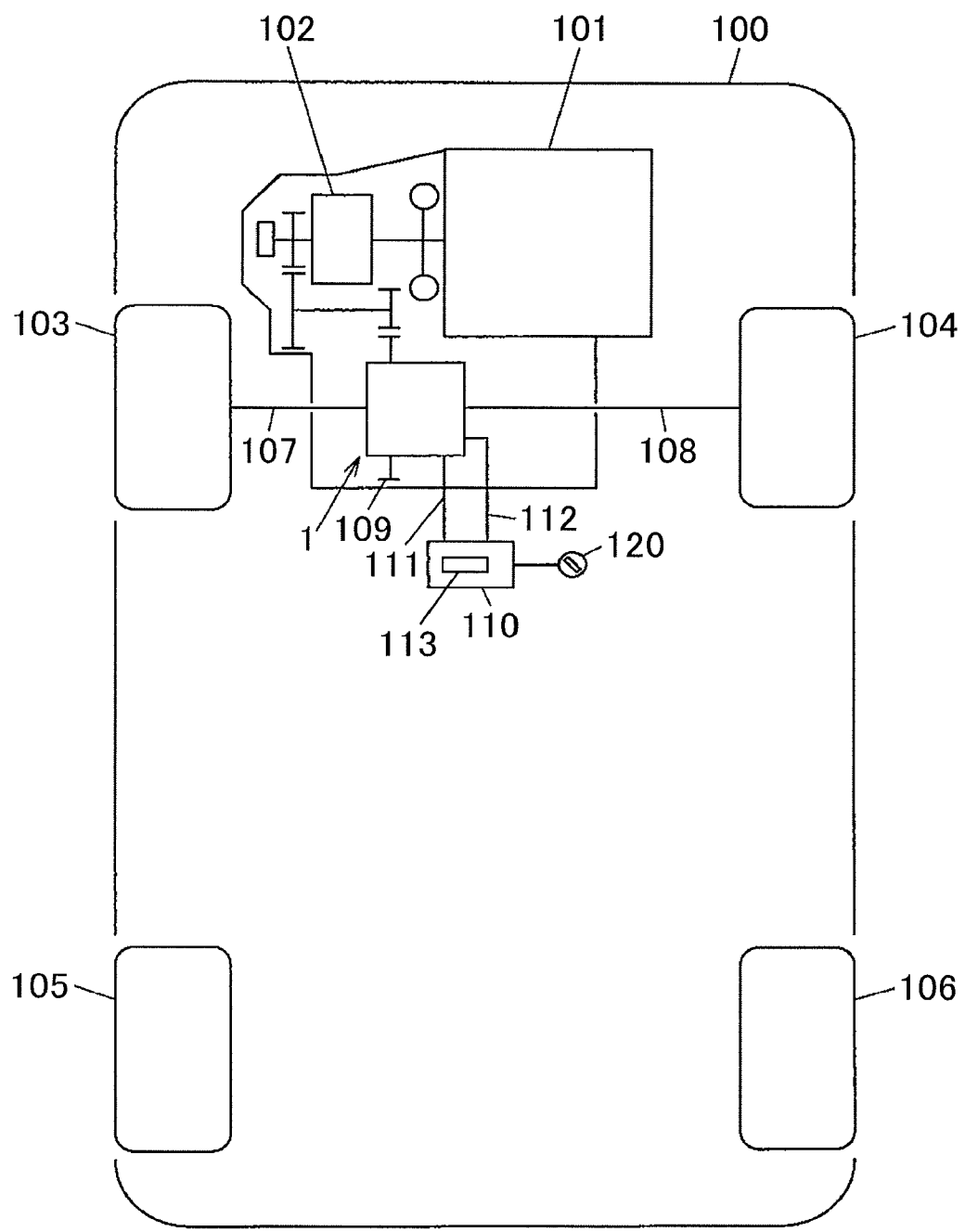
FIG. 1 is a schematic view illustrating an exemplary configuration of a vehicle equipped with a differential gear in which a dog clutch is incorporated, according to an embodiment of the present invention.
Figure 2:
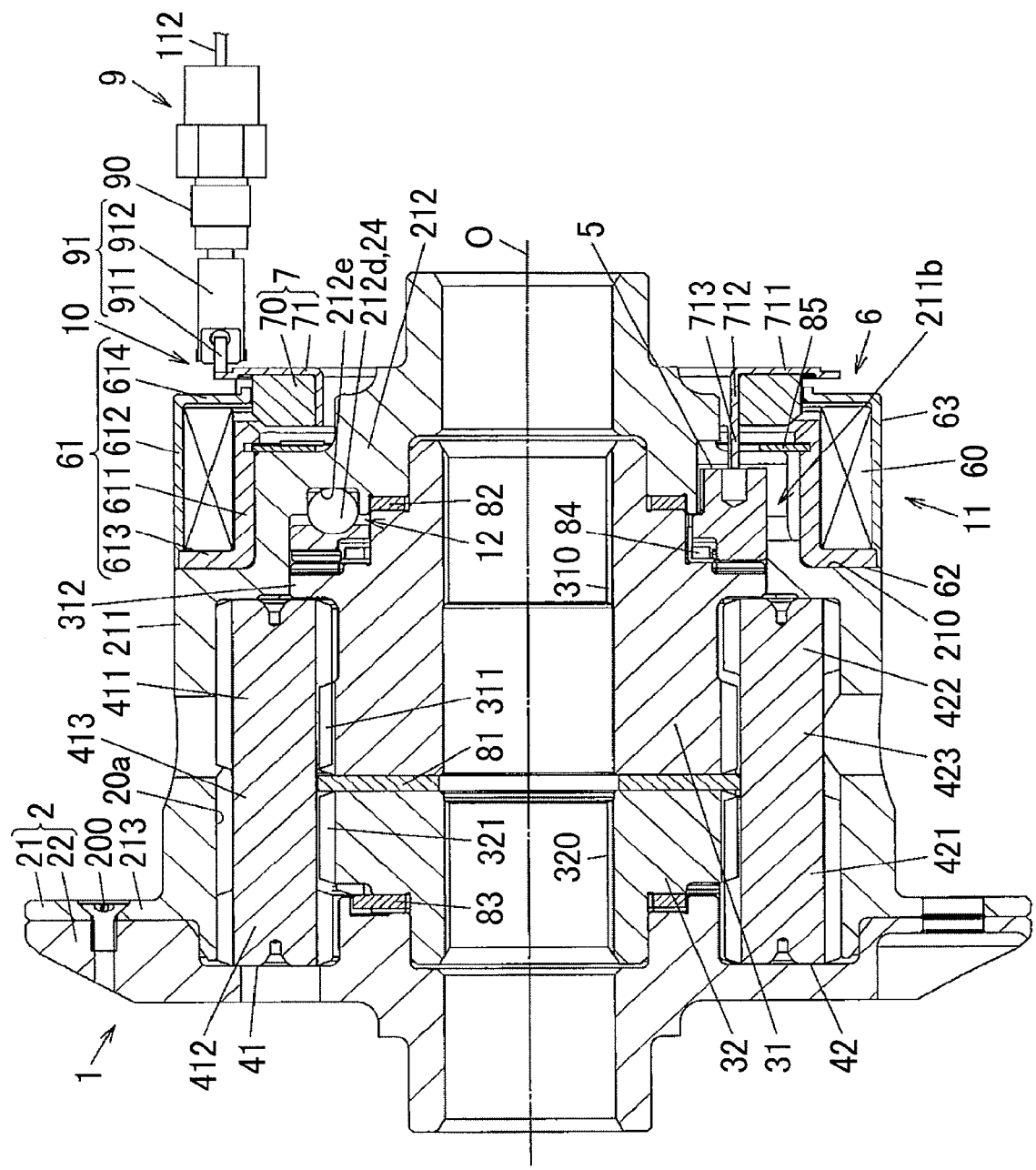
FIG. 2 is a sectional view illustrating an exemplary configuration of the differential gear according to the embodiment of the present invention.
Figure 3:
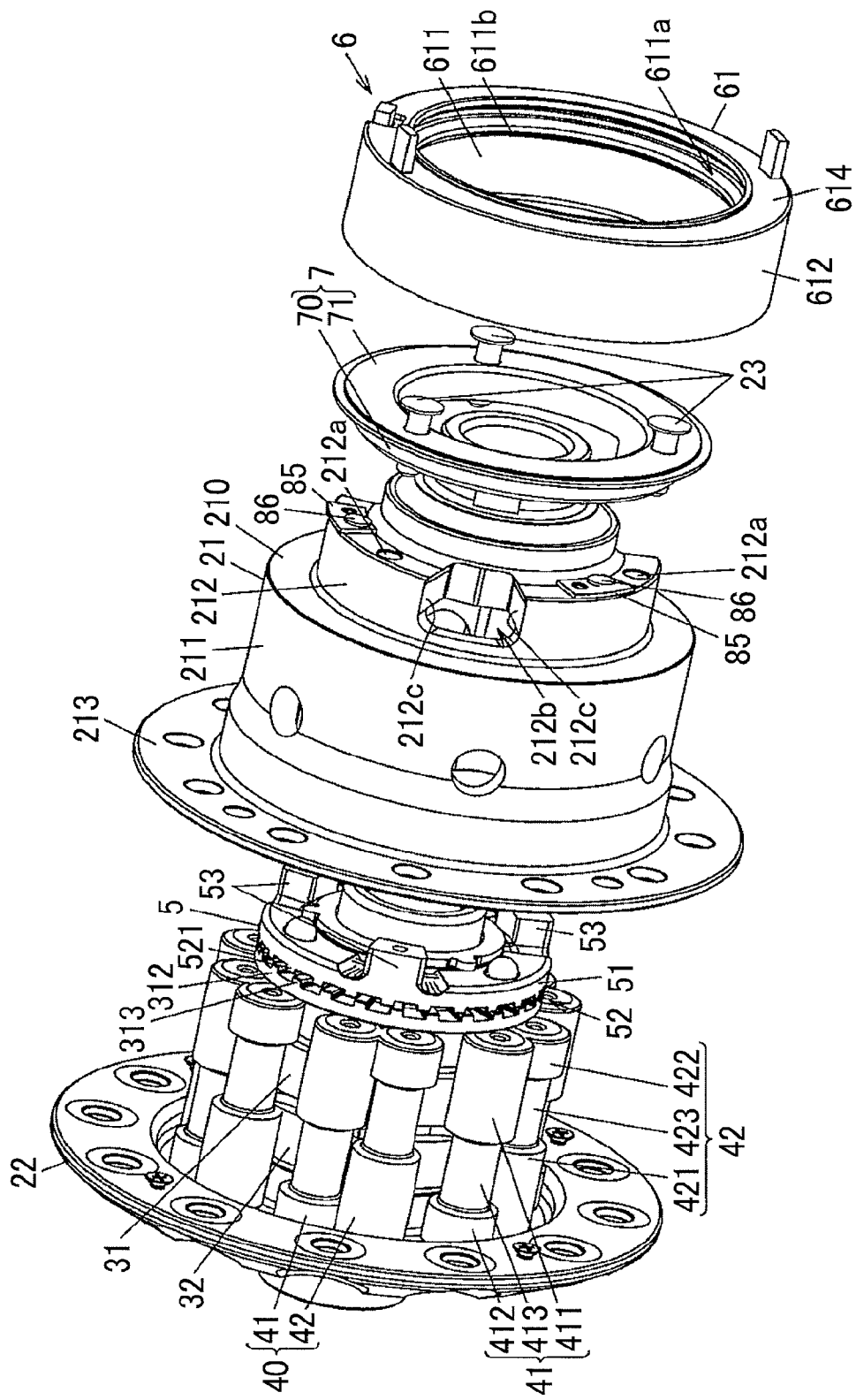
FIG. 3 is an exploded perspective view of the differential gear.
Figure 5A:
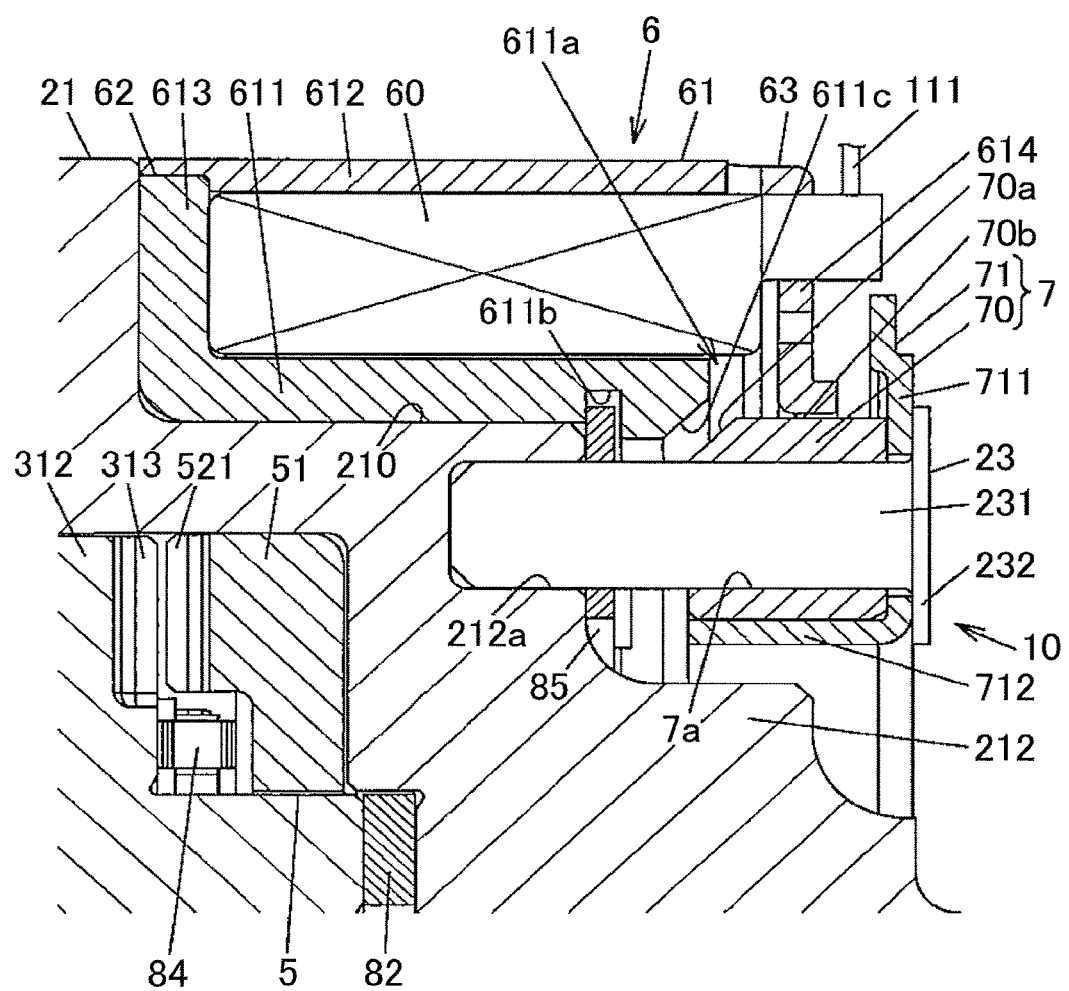
FIG. 5A is a sectional view illustrating a part of the differential gear in an enlarged manner.
Figure 5B:
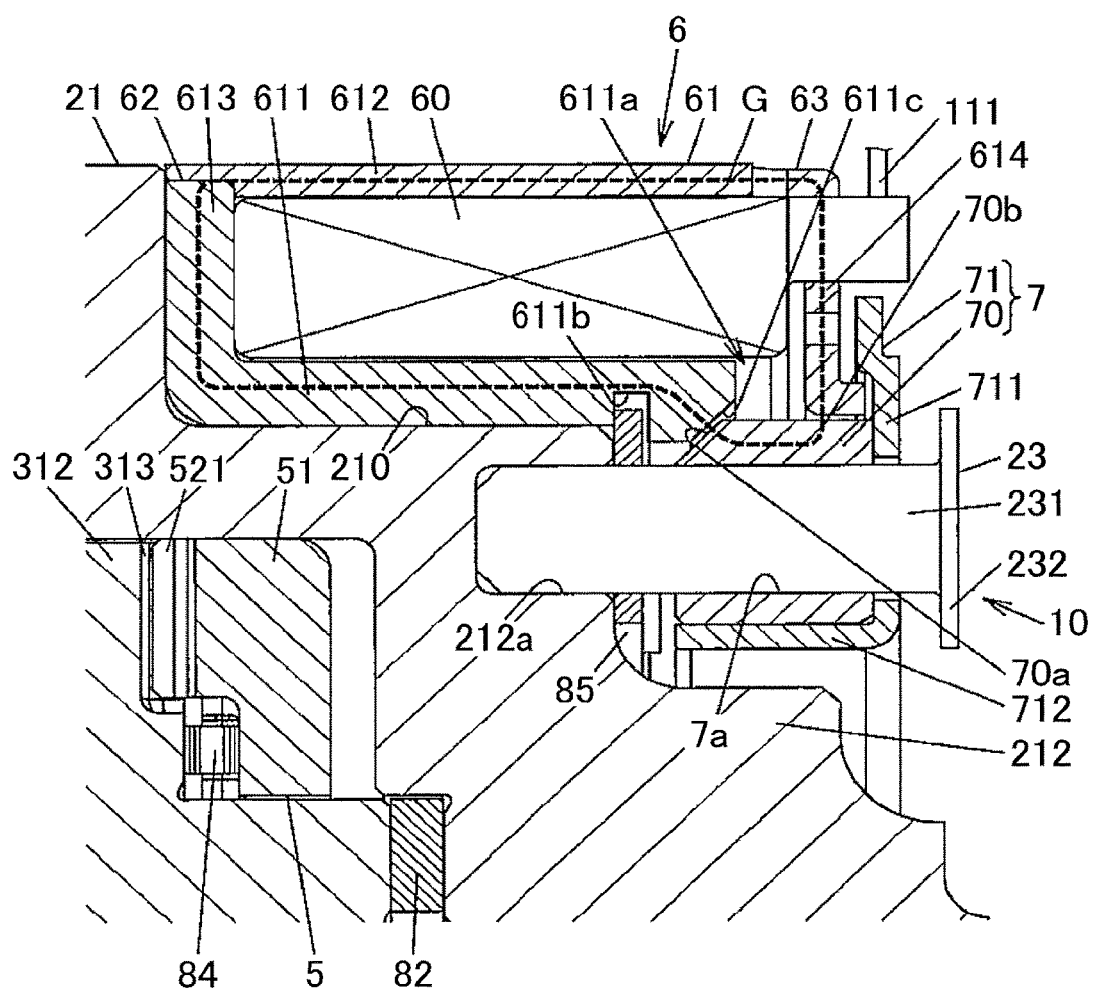
FIG. 5B is a sectional view illustrating a part of the differential gear in an enlarged manner.

FIG. 1 is a schematic view illustrating an exemplary configuration of a vehicle equipped with a differential gear in which a dog clutch is incorporated, according to an embodiment of the present invention. FIG. 2 is a sectional view illustrating the exemplary configuration of the differential gear. FIG. 3 is an exploded perspective view of the differential gear. FIGS. 4A and 4B are each a perspective view of a clutch member constituting a pressing mechanism of the dog clutch. FIGS. 5A and 5B are each a sectional view illustrating a part of the differential gear in an enlarged manner.

A vehicle 100 includes: an engine 101 as a driving force source; a transmission 102; a differential gear 1; a control device 110 for controlling the differential gear 1; right and left front wheels 103, 104 and right and left rear wheels 105, 106; and right and left drive shafts 107, 108. The differential gear 1 receives a driving force of the engine 101 via a ring gear 109, the driving force being changed in speed by the transmission 102, and distributes the driving force to the right and left drive shafts 107, 108 as a pair of output shafts. The control device 110 includes an ECU 113. The control device 110 supplies an exciting current to an electromagnetic coil 60 (illustrated in FIG. 2) of the differential gear 1 via a cable 111. Further, the control device 110 receives a detection signal from a position sensor (illustrated in FIG. 2) of the differential gear 1 through a signal wire 112.

Further, a lock mode selecting switch 120 operated by a driver of the vehicle 100 is connected to the control device 110. When the lock mode selecting switch 120 enters an ON state, a relative rotation between the right and left drive shafts 107, 108 is restricted. At the time of traveling on a rough road such as a mud road, for example, the driver turns on the lock mode selecting switch 120. Hereby, even if one of the right and left front wheels 103, 104 is stuck in the mud, it is possible to travel by a driving force transmitted to the other wheel.

The following describes details of a configuration and an operation of the differential gear 1 into which a dog clutch is incorporated, according to the embodiment of the present invention, and a control consent of the control device 110. Note that, in the following description, a right side and a left side of FIG. 2 may be just referred to as the "right side" and the "left side" for convenience, but the "right side" and the "left side" herein do not necessarily limit right and left in a vehicle width direction in a state where the differential gear 1 is provided in the vehicle 100.

The differential gear 1 includes: a differential case 2 to which the ring gear 109 (illustrated in FIG. 1) is fixed; a first side gear 31 and a second side gear 32 stored in the differential case 2; a plurality of (five in the present embodiment) of pinion gear sets 40 each configured such that a first pinion gear 41 and a second pinion gear 42 are meshed with each other; a clutch member 5 that can transmit a torque between the differential case 2 and the first side gear 31; a position sensor 9 serving as a position detecting portion for detecting a position of the clutch member 5; and a pressing mechanism 10 for giving a pushing pressure to the clutch member 5. The differential case 2, the first side gear 31, the clutch member 5, the position sensor 9, and the pressing mechanism 10 constitute a dog clutch 11.

The first side gear 31 is placed on the right side and the second side gear 32 is placed on the left side. The first side gear 31 and the second side gear 32 have a cylindrical shape. A spline portion 310 to which the drive shaft 108 is connected in a relatively non-rotatable manner is formed on an inner peripheral surface of the first side gear 31, and a spline portion 320 to which the drive shaft 107 is connected in a relatively non-rotatable manner is formed on an inner peripheral surface of the second side gear 32.

The differential case 2, the first side gear 31, and the second side gear 32 are placed rotatable relative to each other around a common rotation axis O. Hereinafter, a direction parallel to the rotation axis O is referred to as an axial direction.

A plurality of holding holes 20 for rotatably holding the first pinion gear 41 and the second pinion gear 42 of the pinion gear sets 40 is formed in the differential case 2. The first pinion gear 41 and the second pinion gear 42 revolve around the rotation axis O and are also rotatable in their corresponding holding holes 20 with their respective central axes being taken as their rotating axes.

The first side gear 31 and the second side gear 32 have a common outer diameter, and gear wheel portions 311, 321 constituted by a plurality of helical teeth are formed on respective outer peripheral surfaces thereof. A center washer 81 is placed between the first side gear 31 and the second side gear 32. Further, a side washer 82 is placed on the right side of the first side gear 31, and a side washer 83 is placed on the left side of the second side gear 32.

The first pinion gear 41 integrally includes a long gear wheel portion 411, a short gear wheel portion 412, and a connection portion 413 for connecting the long gear wheel portion 411 to the short gear wheel portion 412 in the axial direction. Similarly, the second pinion gear 42 integrally includes a long gear wheel portion 421, a short gear wheel portion 422, and a connection portion 423 for connecting the long gear wheel portion 421 to the short gear wheel portion 422 in the axial direction.

The first pinion gear 41 is configured such that: the long gear wheel portion 411 meshes with the gear wheel portion 311 of the first side gear 31 and the short gear wheel portion 422 of the second pinion gear 42; and the short gear wheel portion 412 meshes with the long gear wheel portion 421 of the second pinion gear 42. The second pinion gear 42 is configured such that: the long gear wheel portion 421 meshes with the gear wheel portion 321 of the second side gear 32 and the short gear wheel portion 412 of the first pinion gear 41; and the short gear wheel portion 422 meshes with the long gear wheel portion 411 of the first pinion gear 41. Note that FIG. 3 does not illustrate the helical teeth of these gear wheel portions.

When the first side gear 31 and the second side gear 32 rotate at the same speed, the first pinion gear 41 and the second pinion gear 42 revolve together with the differential case 2 without rotating in respective holding holes 20. Further, when the first side gear 31 and the second side gear 32 have different rotation speeds at the time of turning of the vehicle 100 and the like, for example, the first pinion gear 41 and the second pinion gear 42 revolve while rotating in respective holding holes 20. Hereby, a driving force input into the differential case 2 is distributed while a differential action between the first side gear 31 and the second side gear 32 is allowed. Note that the differential case 2 is an example of a "first rotational member" of the present invention, and the first side gear 31 is an example of a "second rotational member" of the present invention.

The clutch member 5 is movable in the axial direction between a connecting position where the differential case 2 is connected to the first side gear 31 in a relatively non-rotatable manner and a non-connecting position where the differential case 2 and the first side gear 31 are allowed to rotate relative to each other. FIG. 5A illustrates a state where the clutch member 5 is placed at the non-connecting position, and FIG. 5B illustrates a state where the clutch member 5 is placed at the connecting position.

When the clutch member 5 is placed at the connecting position, a differential action between the differential case 2 and the first side gear 31 is restricted, so that the first pinion gear 41 and the second pinion gear 42 cannot rotate and the differential action between the differential case 2 and the second side gear 32 is also restricted. The clutch member 5 is biased toward the non-connecting position by a return spring 84 placed between the clutch member 5 and the first side gear 31.

The pressing mechanism 10 includes an electromagnet 6 for generating an electromagnetic force, and a plunger 7 moved in the axial direction by a magnetic force of the electromagnet 6 so as to press and move the clutch member 5 in the axial direction. The electromagnet 6 includes a cylindrical electromagnetic coil 60, and a yoke 61 serving as a magnetic path of a magnetic flux generated by current application to the electromagnetic coil 60. The electromagnetic coil 60 generates a magnetic force to move the clutch member 5 in the axial direction from the non-connecting position toward the connecting position.

The yoke 61 includes: an inner ring portion 611 opposed to an inner peripheral surface of the electromagnetic coil 60; an outer ring portion 612 opposed to an outer peripheral surface of the electromagnetic coil 60; and first and second axial end portions 613, 614 opposed to respective axial end surfaces of the electromagnetic coil 60. The first axial end portion 613 is opposed to a left end portion of the electromagnetic coil 60, and the second axial end portion 614 is opposed to a right end portion of the electromagnetic coil 60. In the present embodiment, the yoke 61 is constituted by an inner member 62 having the inner ring portion 611 and the first axial end portion 613, and an outer member 63 having the outer ring portion 612 and the second axial end portion 614. The inner member 62 and the outer member 63 are integrated by welding.

A discontinuous portion 611a where the magnetic path of the magnetic flux of the electromagnetic coil 60 becomes discontinuous is formed in the inner ring portion 611 of the yoke 61 along a circumferential direction. In the present embodiment, an axial length of the inner ring portion 611 of the yoke 61 is shorter than an axial length of the outer ring portion 612, and a gap formed between an axial end portion of the inner ring portion 611 and the second axial end portion 614 serves as the discontinuous portion 611a.

Further, a cut 611b formed in a radial direction is formed on an inner peripheral surface of the inner ring portion 611 on a first axial-end-portion-613 side relative to the discontinuous portion 611a. Outer peripheral ends of a plurality of (three in the present embodiment) flabellate fixing plates 85 made of a nonmagnetic material are fitted to the cut 611b. In FIG. 3, two fixing plates 85 among them are illustrated. The fixing plate 85 is fixed to the differential case 2 by a pin 86. An axial position of the yoke 61 relative to the differential case 2 is fixed such that the fixing plates 85 are fitted to the cut 611b.

The plunger 7 includes an annular magnetic material core 70 made of a soft magnetic material, and a pressing member 71 made of a nonmagnetic material and configured to move in the axial direction integrally with the magnetic material core 70 so as to press the clutch member 5. The magnetic material core 70 is axially opposed to at least one end portion out of both end portions of the yoke 61 across the discontinuous portion 611a. In the present embodiment, part of an outer peripheral side of the magnetic material core 70 is opposed to an end portion of the inner ring portion 611 of the yoke 61 on a second-axial-end-portion-614 side.

More specifically, an inclined surface 70a inclined relative to the axial direction is formed in a part of the outer peripheral side of the left end portion of the magnetic material core 70, and an inclined surface 611c inclined relative to the axial direction so as to be parallel to the inclined surface 70a of the magnetic material core 70 is formed in an axial end portion of the inner ring portion 611 of the yoke 61 on a discontinuous-portion-611a side. The inclined surface 70a of the magnetic material core 70 is axially opposed to the inclined surface 611c of the inner ring portion 611 of the yoke 61. Further, the outer peripheral surface 70b of the magnetic material core 70 is opposed to an end portion of the second axial end portion 614 of the yoke 61 on the inner peripheral side.

The pressing member 71 includes: an annular plate portion 711 opposed to an axial end surface of the magnetic material core 70; a cylindrical plate portion 712 opposed to an inner peripheral surface of the magnetic material core 70; and a plurality of (three in the present embodiment) extending portions 713 axially extended from the cylindrical plate portion 712 and abutting with an axial end surface (a distal surface 53b of the after-mentioned engageable portion 53) of the clutch member 5 so as to press the clutch member 5.

The differential case 2 includes: a first case member 21 and a second case member 22 fixed to each other by a plurality of screws 200; and a plurality of (three in the present invention) pillar-shaped guide members 23 fixed to the first case member 21 so as to axially guide the plunger 7. The plunger 7 is movable in the axial direction relative to the differential case 2 by being guided by the guide members 23.

The guide member 23 is a nonmagnetic material made of austenitic stainless steel or aluminum, for example, and integrally includes a columnar shaft portion 231 and a falling-off prevention portion 232 provided in one end of the shaft portion 231, as illustrated in FIGS. 5A and 5B. Insertion holes 7a through which the shaft portions 231 of the guide members 23 are passed are formed at a plurality of (three in the present embodiment) places in the plunger 7. The insertion holes 7a extend in the axial direction so as to axially penetrate through the magnetic material core 70 and the pressing member 71.

The shaft portion 231 of the guide member 23 has an outside diameter slightly smaller than an inside diameter of the insertion hole 7a of the plunger 7, and a longitudinal direction along its central axis is parallel to the rotation axis O. The falling-off prevention portion 232 has a discoid shape having an outside diameter larger than the inside diameter of the insertion hole 7a of the plunger 7, and abuts with an end of the plunger 7 on an opposite side to the clutch member 5 so as to prevent the plunger 7 from falling off.

As illustrated in FIG. 2, the position sensor 9 includes: a body portion 90 supported by a bracket (not shown) fixed to a vehicle body; and a movable portion 91 movable relative to the body portion 90 in a reciprocating manner in parallel to the rotation axis O. The movable portion 91 includes a roller 911 making contact with the annular plate portion 711 of the pressing member 71, and a support portion 912 pivotally supporting the roller 911. The roller 911 rotates along with a rotation of the plunger 7. Further, the movable portion 91 moves in the axial direction together with the plunger 7 and the clutch member 5 while maintaining the contact between the roller 911 and the pressing member 71.

A detection signal of the position sensor 9 is sent to the control device 110 through the signal wire 112. In the present embodiment, when the clutch member 5 is placed at the non-connecting position, the detection signal of the position sensor 9 is in an OFF state, and when the clutch member 5 moves from the non-connecting position to the connecting position, the detection signal of the position sensor 9 is switched from OFF to ON. The control device 110 detects, by the position sensor 9, that the clutch member 5 has moved to the connecting position. Note that the position sensor 9 may be a linear scale that can continuously measure an axial position of the clutch member 5. In this case, when a moving amount from an initial position (a position at the time when no current is applied to the electromagnetic coil 60) of the clutch member 5, the moving amount being measured by the position sensor 9, exceeds a predetermined value, the control device 110 detects that the clutch member 5 has moved to the connecting position.

The first case member 21 integrally includes: a cylindrical portion 211 having a cylindrical shape and holding the plurality of pinion gear sets 40 rotatably; a bottom portion 212 extending inwardly from one end of the cylindrical portion 211; and a flange portion 213 butted against the second case member 22. An annular recess 210 to which the electromagnet 6 is mounted is formed at a corner between the cylindrical portion 211 and the bottom portion 212.

The first side gear 31 and the second side gear 32 are placed inside the cylindrical portion 211. Further, the first case member 21 is made of metal having a magnetic permeability lower than the yoke 61, and the ring gear 109 (illustrated in FIG. 1) is fixed to the flange portion 213. The differential case 2 rotates around the rotation axis O by a driving force transmitted from the ring gear 109. The ring gear 109 is mounted to the differential case 2 from a bottom-portion-212 side of the first case member 21. At this time, the electromagnet 6 is stored in the annular recess 210. Since an outside diameter of the electromagnet 6 is equal to an outside diameter of the cylindrical portion 211 of the first case member 21, the ring gear 109 can be mounted with the electromagnet 6 being fixed.

As illustrated in FIG. 3, in the bottom portion 212 of the first case member 21, a plurality of press-fitting holes 212a into which one ends of the shaft portions 231 of the guide members 23 are press-fitted, and a plurality of insertion holes 212b through which the extending portions 713 of the pressing members 71 are passed are formed. The insertion hole 212b axially penetrates through the bottom portion 212. In the present embodiment, three press-fitting holes 212a and three insertion holes 212b are formed at regular intervals in a circumferential direction of the bottom portion 212. FIG. 3 illustrates two press-fitting holes 212a and one insertion hole 212b among them.

When a current is applied to the electromagnetic coil 60, a magnetic flux is generated in a magnetic path G indicated by a broken line in FIG. 5B, and the plunger 7 is drawn to the inner ring portion 611 so that the inclined surface 70a of the magnetic material core 70 approaches the inclined surface 611c of the inner ring portion 611 of the yoke 61. Hereby, the magnetic material core 70 receives a magnetic force so that a tip end of the extending portion 713 of the pressing member 71 abuts with an axial end surface of the clutch member 5 so as to press the clutch member 5.

The clutch member 5 is placed inside the yoke 61 because an outermost diameter (a diameter of an outermost part) of the clutch member 5 is smaller than an inside diameter (a minimum diameter of the inner ring portion 611) of the yoke 61. Further, as illustrated in FIGS. 4A and 4B, the clutch member 5 integrally includes: a circular plate portion 51 having an annular disk shape and including a plurality of bowl-shaped recessed portions 510 formed on one axial end surface 51a; a meshing portion 52 formed on the other axial end surface 51b of the circular plate portion 51, the other axial end surface 51b being axially opposed to the first side gear 31; and engageable portions 53 having a trapezoidal pillar shape and formed so as to axially project from the one axial end surface 51a of the circular plate portion 51.

The circular plate portion 51 is placed on a radially inner side of the annular recess 210 where the electromagnet 6 is mounted. The one axial end surface 51a of the circular plate portion 51 is axially opposed to the bottom portion 212 of the first case member 21. The engageable portion 53 is partially inserted into the insertion hole 212b formed in the bottom portion 212 of the first case member 21. A plurality of meshing teeth 521 projecting in the axial direction is formed in the meshing portion 52. The plurality of meshing teeth 521 is formed in a part, on the outer peripheral side, of the other axial end surface 51b of the circular plate portion 51, and the axial end surface 51b provided on an inner side relative to the meshing portion 52 is formed as a flat receiver surface that abuts with the return spring 84 so as to receive a biasing force toward the non-connecting position.

The first side gear 31 is configured such that a plurality of meshing teeth 313 meshing with the plurality of meshing teeth 521 of the clutch member 5 is formed in an annular wall portion 312 provided in a projecting manner on the outer peripheral side relative to the gear wheel portion 311.

When the clutch member 5 is pressed by the plunger 7 and moved in the axial direction, the plurality of meshing teeth 521 of the meshing portion 52 meshes with the plurality of meshing teeth 313 of the first side gear 31. That is, when the clutch member 5 moves toward the first side gear 31, the clutch member 5 and the first side gear 31 are connected to each other in a relatively non-rotatable manner by meshing between the plurality of meshing teeth 521, 313.

In the first case member 21, an engaged portion to which the engageable portion 53 of the clutch member 5 circumferentially engages is constituted by the insertion hole 212b. The engageable portion 53 of the clutch member 5 includes an abutting surface 53a that abuts with an inner surface 212c (see FIG. 3) of the insertion hole 212b so as to receive a torque from the first case member 21.

Further, the distal surface 53b of the engageable portion 53 is formed as a pressed surface with which the tip end of the extending portion 713 of the pressing member 71 abuts. When a current is applied to the electromagnetic coil 60, the plunger 7 presses the clutch member 5 toward an annular-wall-portion-312 side of the first side gear 31 such that the extending portion 713 of the pressing member 71 abuts with the distal surface 53b of the engageable portion 53.

An inner surface 510a of the bowl-shaped recessed portion 510 is formed as a cam surface to generate an axial cam thrust by a relative rotation with respect to the first case member 21. In other words, in the clutch member 5, a part of an opposed surface (one axial end surface 51a) of the circular plate portion 51 to the bottom portion 212 of the first case member 21 is formed as a cam surface.

As illustrated in FIG. 2, a projection 212d that abuts with the inner surface 510a of the bowl-shaped recessed portion 510 is provided in the bottom portion 212 of the first case member 21 so as to project in the axial direction. In the present embodiment, the projection 212d is constituted by a sphere 24 fixed to the bottom portion 212. The sphere 24 is partially stored in an axial recess 212e provided in the bottom portion 212, so as to be held by the first case member 21. Note that the projection 212d may be formed integrally as a part of the bottom portion 212. Even in this case, it is desirable that a tip end of the projection 212d be spherical.

The insertion hole 212b of the bottom portion 212 has a circumferential width wider than a circumferential width of the engageable portion 53 of the clutch member 5, and a relative rotation between the differential case 2 and the clutch member 5 is restricted within a predetermined angle range corresponding to a difference between the circumferential width of the insertion hole 212b and the circumferential width of the engageable portion 53. The inner surface 510a of the bowl-shaped recessed portion 510 is formed in the clutch member 5 over an angle range larger than this predetermined angle range. Hereby, even if the clutch member 5 rotates relative to the differential case 2, the tip end of the projection 212d (the sphere 24) is always stored in the bowl-shaped recessed portion 510 so as to be axially opposed to the inner surface 510a.

Figure 6A:
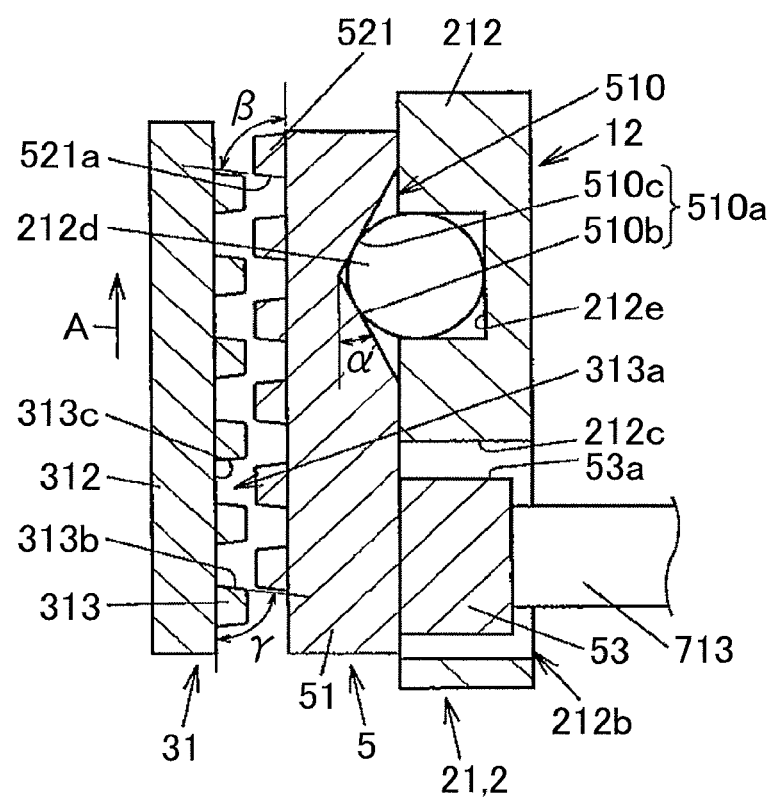
FIG. 6A is an explanatory view schematically illustrating an operation of a cam mechanism.
Figure 6B:
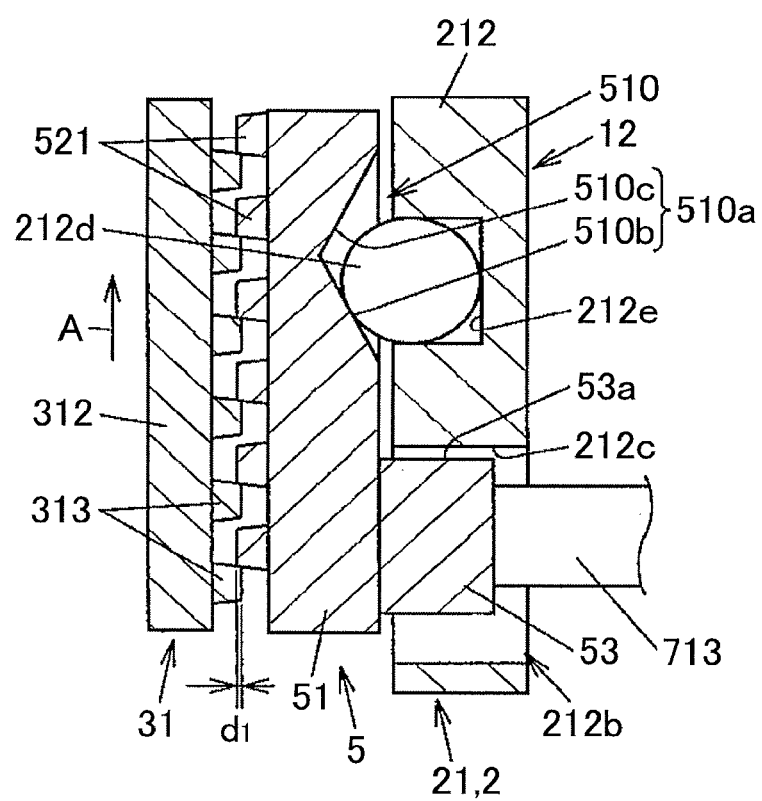
FIG. 6B is an explanatory view schematically illustrating the operation of the cam mechanism.
Figure 6C:
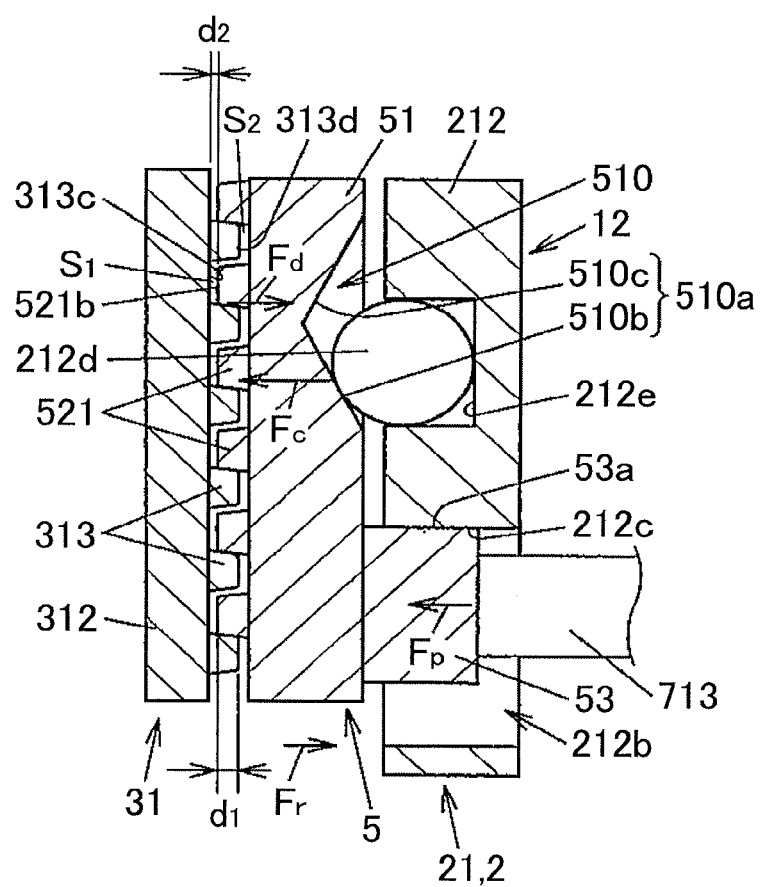
FIG. 6C is an explanatory view schematically illustrating the operation of the cam mechanism.

The projection 212d of the bottom portion 212 of the first case member 21 and the bowl-shaped recessed portion 510 of the circular plate portion 51 of the clutch member 5 constitute a cam mechanism 12 for generating an axial thrust to separate the clutch member 5 from the bottom portion 212. Referring now to FIG. 6A to 6C, an operation of the cam mechanism 12 will be described below.

FIGS. 6A to 6C are explanatory views schematically illustrating the operation of the cam mechanism 12 in the dog clutch 11 with a circumferential section of the clutch member 5, the bottom portion 212 of the first case member 21, and the annular wall portion 312 of the first side gear 31. In FIGS. 6A and 6B, a rotation direction of the first side gear 31 relative to the differential case 2 (the first case member 21) is indicated by an arrow A.

As illustrated in FIG. 6A, the inner surface 510a of the bowl-shaped recessed portion 510 is constituted by a first inclined surface 510b inclined toward one side in a circumferential direction of the clutch member 5, and a second inclined surface 510c inclined toward the other side in the circumferential direction of the clutch member 5. An inclination angle of the first inclined surface 510b to the circumferential direction of the clutch member 5 is the same as an inclination angle of the second inclined surface 510c.

The meshing tooth 521 of the clutch member 5 and the meshing tooth 313 of the first side gear 31 both have a trapezoidal section. A plurality of recessed portions 313a fitted to the meshing teeth 521 of the clutch member 5 is formed each between the meshing teeth 313 adjacent to each other in the circumferential direction. A tooth flank 521a of the meshing tooth 521 of the clutch member 5 and a tooth flank 313b of the meshing tooth 313 of the first side gear 31 are diagonally inclined relative to the circumferential direction (the rotation direction) of the clutch member 5 and the first side gear 31. Hereby, due to a torque transmitted between the differential case 2 and the first side gear 31, a meshing reaction force for pressing the clutch member 5 toward the non-connecting position side is generated.

When an inclination angle (a cam angle) of the first inclined surface 510b and the second inclined surface 510c in the bowl-shaped recessed portion 510 of the clutch member 5 is assumed α, an inclination angle of the tooth flank 521a of the meshing tooth 521 relative to the circumferential direction of the clutch member 5 is assumed β, and an inclination angle of the tooth flank 313b of the meshing tooth 313 relative to the circumferential direction of the first side gear 31 is assumed γ, β=γ is established, and α is smaller than β and γ. Hereby, when the cam mechanism 12 is operated and the meshing teeth 521 of the clutch member 5 mesh with the meshing teeth 313 of the first side gear 31, a cam thrust of the cam mechanism 12 becomes larger than a meshing reaction force of the meshing teeth 521, 313, so that the clutch member 5 is not pushed back toward the bottom portion 212 of the first case member 21 by the meshing reaction force.

When no current is applied to the electromagnetic coil 60, the clutch member 5 is pressed against the bottom portion 212 of the first case member 21 by a biasing force of the return spring 84. This state is illustrated in FIG. 6A. As illustrated in FIG. 6A, the projection 212d of the bottom portion 212 abuts with a backmost part of the bowl-shaped recessed portion 510, and the meshing teeth 521 of the clutch member 5 do not mesh with the meshing teeth 313 of the first side gear 31. In this state, the differential case 2 is rotatable relative to the first side gear 31, so a torque input into the differential case 2 is distributed while a differential action between the first side gear 31 and the second side gear 32 is allowed. Further, the detection signal of the position sensor 9 is in the OFF state.

When the lock mode selecting switch 120 is switched by a driver from the OFF state to the ON state, the control device 110 supplies, to the electromagnetic coil 60, an exciting current to move the clutch member 5 from the non-connecting position to the connecting position. When the exciting current is supplied to the electromagnetic coil 60, the pressing member 71 of the plunger 7 presses the clutch member 5 due to its magnetic force, and after that, the cam mechanism 12 operates so that the clutch member 5 meshes with the first side gear 31. FIG. 6B illustrates a state at the time when the meshing starts, and FIG. 6C illustrates a state where the meshing is completed.

As illustrated in FIG. 6B, when a current is applied to the electromagnetic coil 60 and the clutch member 5 is pressed by the pressing member 71 of the plunger 7, respective tip ends of the meshing teeth 521 of the clutch member 5 and the meshing teeth 313 of the first side gear 31 mesh with each other. At this time, the detection signal of the position sensor 9 is switched from the OFF state to the ON state. Note that, in a case where a relative rotation speed between the differential case 2 and the first side gear 31 is fast, even if the clutch member 5 is pressed by the plunger 7, the meshing teeth 521 of the clutch member 5 may not mesh with the meshing teeth 313 of the first side gear 31 soon. A mounted position of the position sensor 9 is adjusted so that the detection signal of the position sensor 9 is not turned ON in such a state.

Due to the meshing between the meshing teeth 521 of the clutch member 5 and the meshing teeth 313 of the first side gear 31, the clutch member 5 rotates following the first side gear 31 so as to rotate relative to the differential case 2, so that the projection 212d of the bottom portion 212 slides on the first inclined surface 510b or the second inclined surface 510c of the bowl-shaped recessed portion 510. FIG. 6B illustrates a case where the projection 212d of the bottom portion 212 slides on the first inclined surface 510b of the bowl-shaped recessed portion 510. Due to this sliding, a part with which the projection 212d of the bottom portion 212 abuts gradually moves to a shallow part of the bowl-shaped recessed portion 510, so that the clutch member 5 moves toward the first side gear 31 by a cam thrust. Hereby, a depth of the meshing between the meshing teeth 521 of the clutch member 5 and the meshing teeth 313 of the first side gear 31 (a distance of an axial overlap between the meshing teeth 521, 313) d1 is gradually deepened.

A relative rotation of the clutch member 5 to the differential case 2 is restricted such that the abutting surface 53a of the engageable portion 53 of the clutch member 5 makes contact with the inner surface 212c of the insertion hole 212b in the first case member 21. That is, as illustrated in FIG. 6C, when the abutting surface 53a of the engageable portion 53 of the clutch member 5 abuts with the inner surface 212c of the insertion hole 212b, the relative rotation of the clutch member 5 to the differential case 2 stops, so that the axial movement of the clutch member 5 to the differential case 2 also stops.

At this time, a gap S1 with an axial dimension of d2 is formed between a bottom face 313c of the recessed portion 313a between the meshing teeth 313 of the first side gear 31 and a distal surface 521b of the meshing tooth 521 of the clutch member 5, as illustrated in FIG. 6C. That is, even if the clutch member 5 rotates relative to the differential case 2, the meshing teeth 521 of the clutch member 5 are not butted against the annular wall portion 312 of the first side gear 31, so that the clutch member 5 does not directly press the first side gear 31 in the axial direction due to the cam thrust of the cam mechanism 12. Further, a gap S2 is also formed between a distal surface 313d of the meshing tooth 313 of the first side gear 31 and the circular plate portion 51 of the clutch member 5.

In a state where the meshing between the meshing teeth 521 of the clutch member 5 and the meshing teeth 313 of the first side gear 31 is completed, the engageable portion 53 of the clutch member 5 engages with the insertion hole 212b of the first case member 21 so that the relative rotation between the differential case 2 and the clutch member 5 is restricted, and due to the meshing between the meshing teeth 521 of the clutch member 5 and the meshing teeth 313 of the first side gear 31, a relative rotation between the clutch member 5 and the first side gear 31 is restricted. Hereby, a relative rotation between the differential case 2 and the first side gear 31 is restricted, and a torque is transmitted from the differential case 2 to the first side gear 31 via the clutch member 5.

As such, when the clutch member 5 moves in a direction to mesh with the first side gear 31, the depth of the meshing with the first side gear 31 is deepened by a cam thrust and then the engageable portion 53 of the clutch member 5 engages with the insertion hole 212b of the first case member 21, so that the clutch member 5 receives a torque from the differential case 2.

Further, a differential action between the differential case 2 and the first side gear 31 is restricted, so that the first pinion gear 41 and the second pinion gear 42 cannot rotate and a differential action between the differential case 2 and the second side gear 32 is also restricted, thereby resulting in that a torque is transmitted to the second side gear 32 from the differential case 2 via the first pinion gear 41 and the second pinion gear 42.

As illustrated in FIG. 6C, when a cam thrust of the cam mechanism 12 is assumed Fc, a pressing force of the plunger 7 due to current application to the electromagnetic coil 60 is assumed Fp, a meshing reaction force between the meshing teeth 521 of the clutch member 5 and the meshing teeth 313 of the first side gear 31 is assumed Fd, and a biasing force of the return spring 84 is assumed Fr, if Fp>Fr is established, it is possible to shift from the state illustrated in FIG. 6A to the state illustrated in FIG. 6B. After that, the meshing between the meshing teeth 521 of the clutch member 5 and the meshing teeth 313 of the first side gear 31 is completed due to the cam thrust Fc of the cam mechanism 12.

When the meshing teeth 521 of the clutch member 5 mesh with the meshing teeth 313 of the first side gear 31, the meshing reaction force Fd is generated, but since the relationship of $\alpha<\beta$, $\gamma$ is established as has been described above, the cam thrust Fc is larger than the meshing reaction force Fd. A condition to maintain the meshing between the meshing teeth 521 of the clutch member 5 and the meshing teeth 313 of the first side gear 31 is Fd+Fr<Fc+Fp.

Further, when the current application to the electromagnetic coil 60 is stopped, the clutch member 5 returns to the non-connecting position illustrated in FIG. 6A by the meshing reaction force Fd and the biasing force Fr of the return spring 84. A condition for this is Fd+Fr>Fc. That is, the inclination angle $\alpha$ of the first inclined surface 510b and the second inclined surface 510c in the bowl-shaped recessed portion 510 of the clutch member 5, the inclination angle $\beta$ of the tooth flank 521a of the meshing tooth 521 of the clutch member 5, the inclination angle $\gamma$ of the tooth flank 313b of the meshing tooth 313 of the first side gear 31, a magnetic force of the electromagnet 6, and a spring constant of the return spring 84 are set so as to satisfy an inequality of Fd+Fr<Fc+Fp and an inequality of Fd+Fr>Fc.

Figure 7:
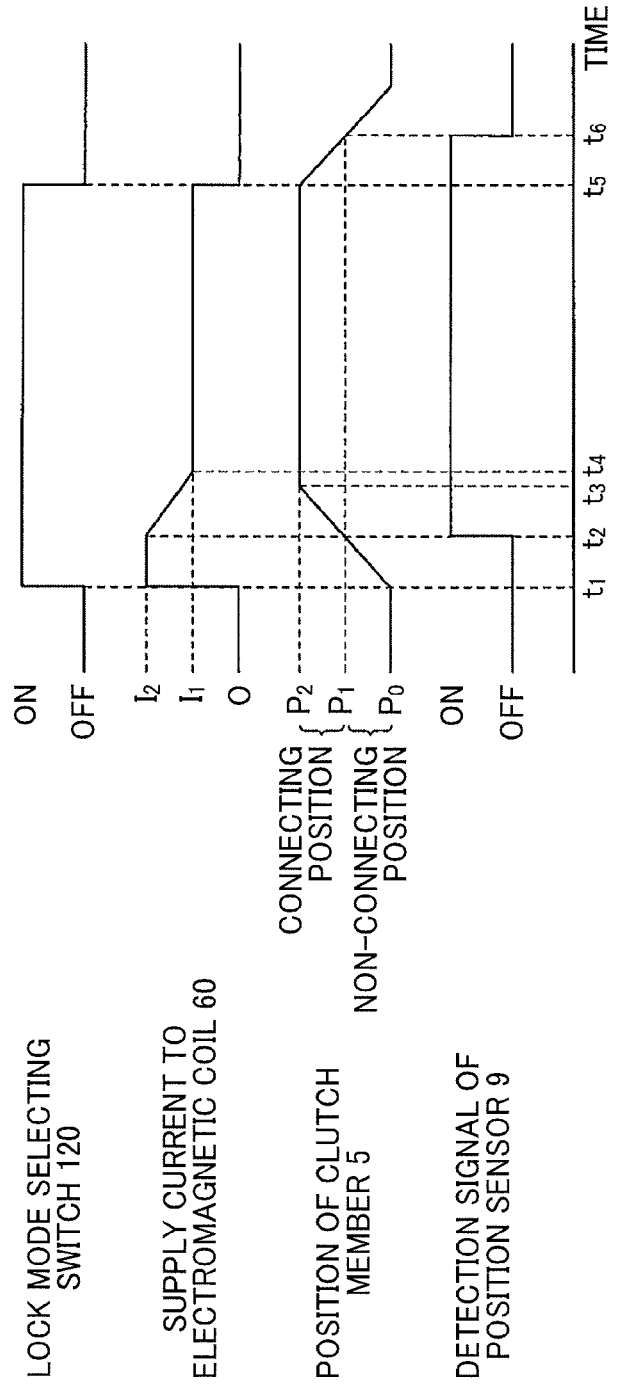
FIG. 7 is a time chart illustrating an example of change of a supply current to an electromagnetic coil, a position of a clutch member, and a detection signal of a position sensor when a lock mode selecting switch is switched on/off.

FIG. 7 is a time chart illustrating an example of change of a supply current to the electromagnetic coil 60, a position of the clutch member 5, and a detection signal of the position sensor 9 when the lock mode selecting switch 120 is switched on/off.

In the time chart of FIG. 7, an initial position P0 indicates a position of the clutch member 5 at the time when the annular plate portion 711 of the pressing member 71 is butted against the falling-off prevention portion 232 of the guide member 23, and a first position P1 indicates a position where the meshing teeth 521 of the clutch member 5 starts to mesh with the meshing teeth 313 of the first side gear 31. Further, a second position P2 indicates a position of the clutch member 5 at the time when the abutting surface 53a of the engageable portion 53 of the clutch member 5 abuts with the inner surface 212c of the insertion hole 212b, namely, a position where the clutch member 5 moves closest to the first side gear 31.

The meshing teeth 521 of the clutch member 5 mesh with the meshing teeth 313 of the first side gear 31 between the first position P1 and the second position P2. A part between the initial position P0 and the first position P1 is the non-connecting position where the clutch member 5 does not mesh with the first side gear 31, and a part between the first position P1 and the second position P2 is the connecting position where the clutch member 5 mesh with the first side gear 31.

When the lock mode selecting switch 120 is switched from OFF to ON at a time t1, the control device 110 supplies an exciting current to the electromagnetic coil 60 promptly. The exciting current at this time is a driving current I2 necessary to move the plunger 7 with the clutch member 5. The clutch member 5 moves in the axial direction from the initial position P0 after the time t1.

When the clutch member 5 reaches the first position P1 at a time t2, the detection signal of the position sensor 9 is switched from OFF to ON. When the control device 110 detects that the clutch member 5 has moved to the connecting position by the change in the detection signal of the position sensor 9, the control device 110 reduces the exciting current to the electromagnetic coil 60 promptly. Here, "promptly" indicates that the reduction of the exciting current is started within 0.1 seconds, for example, without waiting until a timer value exceeds a predetermined value after a timer is started, for example. The control device 110 reduces the exciting current to the electromagnetic coil 60 before the second position P2 of the clutch member 5 (on a first-position-P1 side) at the latest.

In the present embodiment, when the control device 110 detects, by the position sensor 9, that the clutch member 5 has moved to the connecting position, the control device 110 reduces the supply current to the electromagnetic coil 60 from the driving current I2 to a holding current I1. The holding current I1 is a current which is smaller than the driving current I2 and which has a current value that can maintain a state where the clutch member 5 is placed at the connecting position. When the clutch member 5 reaches the first position P1, if there is a relative rotation between the clutch member 5 and the differential case 2, the cam mechanism 12 can generate a cam thrust. On this account, even if the supply current to the electromagnetic coil 60 is reduced promptly, the clutch member 5 moves to the second position P2 by a cam thrust of the cam mechanism 12. That is, in the present embodiment, when it is determined that the cam mechanism 12 generates a cam thrust, the control device 110 reduces the supply current to the electromagnetic coil 60.

When the control device 110 detects, by the position sensor 9, that the clutch member 5 has moved to the connecting position, the control device 110 gradually reduces the supply current to the electromagnetic coil 60 from the driving current I2 to the holding current I1. Here, "gradually" indicates that the supply current to the electromagnetic coil 60 is slowly reduced at a rate of change that is slower than a rise of the current at the time when the lock mode selecting switch 120 is switched from OFF to ON. In the present embodiment, the supply current to the electromagnetic coil 60 reaches the holding current I1 at a time t4, which is after a time (a time t3) when the clutch member 5 reaches the second position P2. Note that the supply current to the electromagnetic coil 60 may reach the holding current I1 before the clutch member 5 reaches the second position P2.

In order to gradually reduce the supply current to the electromagnetic coil 60, the control device 110 includes current adjusting means having a switching element such as a transistor that is switched by a PWM control, for example. The control device 110 gradually reduces the supply current to the electromagnetic coil 60 by gradually lowering a duty ratio of the switching element. Note that FIG. 7 illustrates a case where the supply current to the electromagnetic coil 60 is linearly reduced at a constant ratio, but this is not the only option, and the rate of change of the current may be increased over time or may be decreased.

When the lock mode selecting switch 120 is switched from ON to OFF at a time t5, the control device 110 sets the supply current to the electromagnetic coil 60 to zero. Hereby, the clutch member 5 returns to the initial position P0 from the second position P2 through the first position P1. When the clutch member 5 moves closer to the initial position P0 than the first position P1 at a time t6, the detection signal of the position sensor 9 is switched from ON to OFF.

Note that, in a case where the lock mode selecting switch 120 is in the ON state, when the detection signal of the position sensor 9 is switched from ON to OFF because the right front wheel 103 runs onto a curb stone or the like and the meshing reaction force Fd temporarily increases to disengage the meshing teeth 521 of the clutch member 5 from the meshing teeth 313 of the first side gear 31, the control device 110 sets the supply current to the electromagnetic coil 60 to the driving current I2 so that the meshing teeth 521 of the clutch member 5 mesh with the meshing teeth 313 of the first side gear 31.

A main operation/working-effect to be provided by the present embodiment described above is as follows.

When the position sensor 9 detects that the clutch member 5 has moved to the connecting position, the control device 110 immediately reduces the supply current to the electromagnetic coil 60. Accordingly, it is possible to reduce power consumption of the electromagnetic coil 60 and also restrain heat generation in comparison with a case where the supply current to the electromagnetic coil 60 is reduced after a predetermined time after it is detected that the clutch member 5 has moved to the connecting position, for example.

When the position sensor 9 detects that the clutch member 5 has moved to the connecting position, the control device 110 gradually reduces the supply current to the electromagnetic coil 60. Accordingly, even in a case where the clutch member 5 temporarily moves back toward the non-connecting position side due to a collision between the meshing teeth 521 of the clutch member 5 and the meshing teeth 313 of the first side gear 31, it is possible to mesh them with each other immediately by a pressing force of the plunger 7.

The control device 110 reduces the supply current to the electromagnetic coil 60 before the position (the second position P2) where the clutch member 5 moves closest to the first side gear 31. Accordingly, it is possible to restrain power consumption and heat generation of the electromagnetic coil 60 in comparison with a case where the supply current to the electromagnetic coil 60 is reduced after the axial movement of the clutch member 5 is completed.

The tooth flank 521*a* of the meshing tooth 521 of the clutch member 5 is inclined so as to generate the meshing reaction force Fd for pressing the clutch member 5 toward the non-connecting position side due to a torque transmitted between the differential case 2 and the first side gear 31. Accordingly, when the supply current to the electromagnetic coil 60 is stopped, the clutch member 5 moves to the non-connecting position immediately.

Since the dog clutch 11 includes the cam mechanism 12, even if the control device 110 reduces the supply current to the electromagnetic coil 60 after a cam thrust of the cam mechanism 12 is generated, the clutch member 5 moves, due to the cam thrust, to a position where the clutch member 5 moves closest to the first side gear 31. On this account, when the control device 110 reduces the supply current to the electromagnetic coil 60 after the cam thrust of the cam mechanism 12 is generated, it is possible to restrain power consumption and heat generation of the electromagnetic coil 60 and to surely mesh the meshing teeth 521, 313 with each other.

The cam thrust Fe of the cam mechanism 12 is larger than the meshing reaction force Fd due to the meshing between the meshing teeth 521 of the clutch member 5 and the meshing teeth 313 of the first side gear 31. Accordingly, a magnetic force generated by the electromagnetic coil 60 should be a magnetic force to such an extent that the plunger 7 and the clutch member 5 can be moved against the biasing force Fr of the return spring 84. On this account, in comparison with a case where the cam thrust Fc is smaller than the meshing reaction force Fd, for example, it is possible to restrain power consumption and heat generation of the electromagnetic coil 60.

The present invention has been described based on the above embodiment, but the present invention is not limited to this embodiment, and various modifications can be made within a range which does not deviate from the gist of the present invention. For example, the above embodiment deals with a case where the present invention is applied to a parallel-axis differential gear in which respective rotating axes of a pair of side gears (the first side gear 31 and the second side gear 32) and a pair of pinion gears (the first pinion gear 41 and the second pinion gear 42) are parallel to each other. However, the present invention is not limited to this, and the present invention is also applicable to a differential gear configured such that a pair of side gears and a pair of pinion gears mesh with each other with their gear axes being at right angles.

What is claimed is:

1. A control method for a dog clutch, the dog clutch including:
    a first rotational member;
    a second rotational member placed rotatable relative to the first rotational member around a common rotating axis;
    a clutch member restricted from rotating relative to the first rotational member, the clutch member having meshing teeth meshing with the second rotational member, the clutch member being movable between a connecting position where the meshing teeth mesh with the second rotational member and a non-connecting position where the meshing teeth do not mesh with the second rotational member;
    an electromagnetic coil configured to generate a magnetic force to move the clutch member from the non-connecting position toward the connecting position; and
    a position detecting portion configured to detect a position of the clutch member,
the control method comprising:
    supplying an exciting current to the electromagnetic coil when the clutch member is moved from the non-connecting position to the connecting position; and
    promptly reducing the exciting current when the position detecting portion detects that the clutch member has moved to the connecting position.

2. The control method according to claim 1, wherein when the position detecting portion detects that the clutch member has moved to the connecting position, the exciting current is gradually reduced.

3. The control method according to claim 1, wherein the exciting current is reduced before a position where the clutch member moves closest to the second rotational member.

4. The control method according to claim 1, wherein a tooth flank of the meshing tooth of the clutch member is inclined in a rotation direction so as to generate a meshing reaction force for pressing the clutch member toward the non-connecting position side due to a torque transmitted between the first rotational member and the second rotational member.

5. The control method according to claim 4, wherein:
    the dog clutch includes a cam mechanism configured to generate a cam thrust to move the clutch member to the connecting position by a relative rotation between the clutch member and the first rotational member; and
    when it is determined that the cam mechanism is in a state where the cam mechanism generates the cam thrust, the exciting current is reduced.

6. The control method according to claim 5, wherein:
    the cam thrust is larger than the meshing reaction force.

7. A control device for a dog clutch, the dog clutch including:
    a first rotational member;
    a second rotational member placed rotatable relative to the first rotational member around a common rotating axis;
    a clutch member restricted from rotating relative to the first rotational member, the clutch member having meshing teeth meshing with the second rotational member, the clutch member being movable between a connecting position where the meshing teeth mesh with the second rotational member and a non-connecting position where the meshing teeth do not mesh with the second rotational member;
    an electromagnetic coil configured to generate a magnetic force to move the clutch member from the non-connecting position toward the connecting position;
    a position detecting portion configured to detect a position of the clutch member,
the control device comprising an ECU, wherein:
    when the clutch member is moved from the non-connecting position toward the connecting position, the ECU is configured to supply an exciting current to the electromagnetic coil; and
    when the position detecting portion detects that the clutch member has moved to the connecting position, the ECU is configured to promptly reduce the exciting current.

* * * * *